Nov. 24, 1936. T. L. ROBINSON 2,062,041
ROLLER BEARING
Filed Nov. 9, 1935
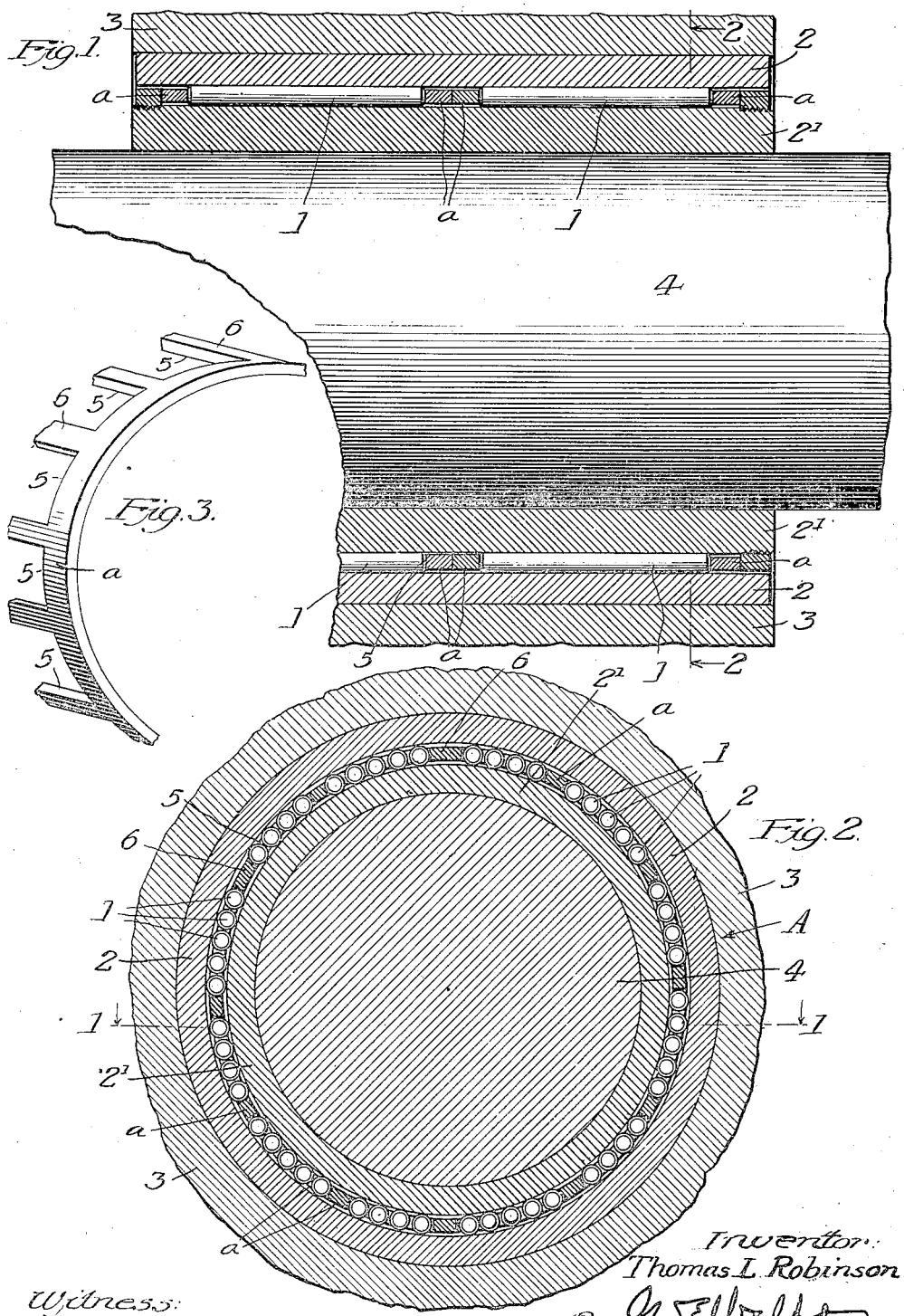
Inventor:
Thomas L. Robinson Patented Nov. 24, 1936

2,062,041

UNITED STATES PATENT OFFICE 2,062,041

ROLLER BEARING

Thomas L. Robinson, Valparaiso, Ind., assignor to McGill Manufacturing Company, Valparaiso, Ind., a corporation of Indiana Application November 9, 1935, Serial No. 49,056

3 Claims. (Cl. 308—217)

This invention relates to roller bearings, and relates particularly to such bearings, the rollers of which are relatively very long as compared with their diameters, and which are maintained in spaced relation with their axes parallel with each other and also with the axis of the bearing, by retainers provided with pockets in which said anti-friction rollers are operatively mounted.

Among objects of the invention are:

1. To provide for using a relatively large total number of rollers per bearing, as compared with present approved practice, thereby reducing the load on each roller, reducing distortion and wear of the bearing elements in operation, and correspondingly increasing the life of the bearing; and 2. To reduce vibration in the bearing—tending to cause fatigue and possible ultimate failure of the anti-friction rollers—produced by an obstruction in the raceway, which may consist of dirt which has worked into the bearing from the outside, a grinding mark or nick therein or other imperfection, which, if the rollers are spaced equal distances apart, will tend to set up a regular vibration in the elements of the bearing of a frequency depending on the number of rollers and the speed of rotation of the bearing.

Other objects of the invention will hereafter be apparent.

To effect the objects thereof, a bearing embodying my invention and improvements, comprises the various features, combinations of features and details of construction hereinafter described and claimed.

In the accompanying drawing, in which the invention is fully illustrated,

Figure 1 is a sectional view of an anti-friction bearing embodying my invention and improvements, on the line 1—1 of Fig. 2, the anti-friction rollers being shown in side view.

Figure 2 is a sectional view on the line 2—2 of Fig. 1, the anti-friction rollers being shown in end view.

Figure 3 shows a portion of the retainer for the rollers.

Describing the invention with reference to the drawing, A designates an anti-friction bearing embodying my invention and improvements, as a whole, 1 the anti-friction rollers thereof, which, as heretofore explained are of a type which are relatively very long as compared with their diameter, a the retainer for guiding said anti-friction rollers, and for aligning them axially with each other and also with the bearing A; 2, 2', are bearing members provided with opposed, concentric cylindrical surfaces, the bearing member 2, as shown, being secured against rotation in a housing 3, and 4 designates a shaft or other member rotatably mounted by means of the bearing member 2'.

Excepting as hereafter particularly described and pointed out, the bearing A may be of any usual or desired construction and will readily be understood by engineers and mechanics familiar with such structures, without a further description thereof in detail.

As shown, the retainer a consists of a section of cylindrical tube of suitable material, preferably, relatively hard steel, punched or otherwise formed, in which are roller pockets 5, the relation being such that, as mounted for operation, the axes of said rollers will be parallel with each other and, also, with the axis of the bearing A.

In accordance with the invention I attain the object thereof, as it relates to increasing the number of anti-friction rollers in the bearings by the provision in the retainer a of roller pockets, which are sufficiently large, circumferentially to receive a plurality of rollers, and adjacent pockets being proportioned to receive different numbers of rollers, thereby reducing the number and aggregate circumferential dimension of the spacing bars which define said roller pockets, and correspondingly increasing the aggregate circumferential dimension of the space available for mounting the anti-friction rollers.

In accordance with the invention, also, I attain the object thereof, as it relates to preventing, minimizing and breaking up vibration in the bearings, including the anti-friction rollers, produced by an obstruction in the raceway, by the use of retainers comprising adjacent roller pockets proportioned, respectively, for mounting different numbers of rollers, and preferably, also, by varying the circumferential dimension of the spacing bars between different roller pockets, or by a combination of such expedients, such irregular spacing and/or irregular distribution, separately or in co-operation, operating to break up vibration, as frequently occurs with regular spacing and distribution of the anti-friction members.

While, within the scope and contemplation of my invention, the size, number and arrangement of the roller pockets admits of a wide range of variation, I prefer, for economy of manufacture, to use two sizes of pockets only, proportioned to accommodate three and four rollers in alternate pockets for smaller bearings, and four and five rollers in the larger bearings. Also, in accordance with the present invention, vibration in the bearing may be still further reduced by making the bars 6 which separate adjacent pockets 5 of different widths circumferentially, thereby producing further irregularity in the spacing of the roller pockets and in the distribution of the anti-friction rollers 1.

I claim:

1. In a bearing of the kind described, an outer cylindrical bearing surface, an opposed inner cylindrical bearing surface, a series of groups of anti-friction rollers interposed between the two surfaces, and means irregularly, circumferentially spacing said groups.

2. In a bearing of the kind described, an outer cylindrical bearing surface, an inner opposed cylindrical bearing surface, anti-friction rollers, interposed between the two surfaces, and a cage having spaced bars including bars of differing circumferential dimensions, which define pockets proportioned to receive different numbers of rollers.

3. In a bearing of the kind described, an outer cylindrical bearing surface, an inner opposed cylindrical bearing surface a series of anti-friction rollers interposed between the two surfaces, a cage having roller pockets of circumferential dimensions such that the pockets snugly contain varying numbers of the rollers, the bars of the cage varying in circumferential dimensions from the circumferential space required for a single roller.

THOMAS L. ROBINSON.